United States Patent [19]

Nikkel et al.

[11] Patent Number: 5,582,255

[45] Date of Patent: Dec. 10, 1996

[54] GUIDANCE SYSTEM HAVING ADJUSTABLE WIDTH CAPABILITY

[75] Inventors: Lee F. Nikkel; Eugene H. Schmidt, both of Madrid, Nebr.

[73] Assignee: A.I.L., Inc., North Platte, Nebr.

[21] Appl. No.: 401,152

[22] Filed: Mar. 9, 1995

[51] Int. Cl.$^6$ .................................................. A01B 69/06
[52] U.S. Cl. ............................................... 172/6; 172/26
[58] Field of Search ............................ 172/5, 6, 26, 702; 180/79, 131

[56] References Cited

U.S. PATENT DOCUMENTS

| Re. 34,080 | 9/1992 | Schmidt . | |
|---|---|---|---|
| 3,195,651 | 7/1965 | Todd . | |
| 3,231,294 | 1/1966 | Horney . | |
| 3,829,128 | 8/1974 | Sutton et al. . | |
| 4,477,101 | 10/1984 | Nilsson et al. . | |
| 4,640,365 | 2/1987 | Schmidt | 172/26 |
| 4,930,581 | 6/1990 | Fleischer et al. | 172/6 |
| 5,170,849 | 12/1992 | Nikkel et al. | 172/6 |

OTHER PUBLICATIONS

Sketch of tractor driven implement guidance device, Orthman Manufacturing, Inc., Lexington, Nebraska, Jul. 1993.

*Primary Examiner*—Spencer K. Warnick, IV
*Attorney, Agent, or Firm*—Greer, Burns & Crain, Ltd.

[57] ABSTRACT

An adjustable row following guidance device for a tractor drawn row crop implement, includes a main support member disposed substantially transverse to the direction of travel of the implement as pulled by the tractor and having a first side and a second side, a first crank arm-assembly being releasably attachable to either of the first side and the second side, a second crank arm assembly being releasably attachable to either of the second side and the first side, the attachment of the crank arm assemblies to the main support member forming a generally inverted U-shape, each crank arm assembly including a laterally offset configuration, so that when the first crank arm assembly is attached to the first end, and the second crank arm assembly is attached to the second end, the device has a first implement width, and when the first and second crank arm assemblies are reversed on the main support member, the device has a second implement width, each crank arm assembly further including a forward portion with a tractor connection point, and a rearward portion with an implement connection point, the implement connection point being rearwardly pivotable relative to the tractor connection point.

15 Claims, 4 Drawing Sheets

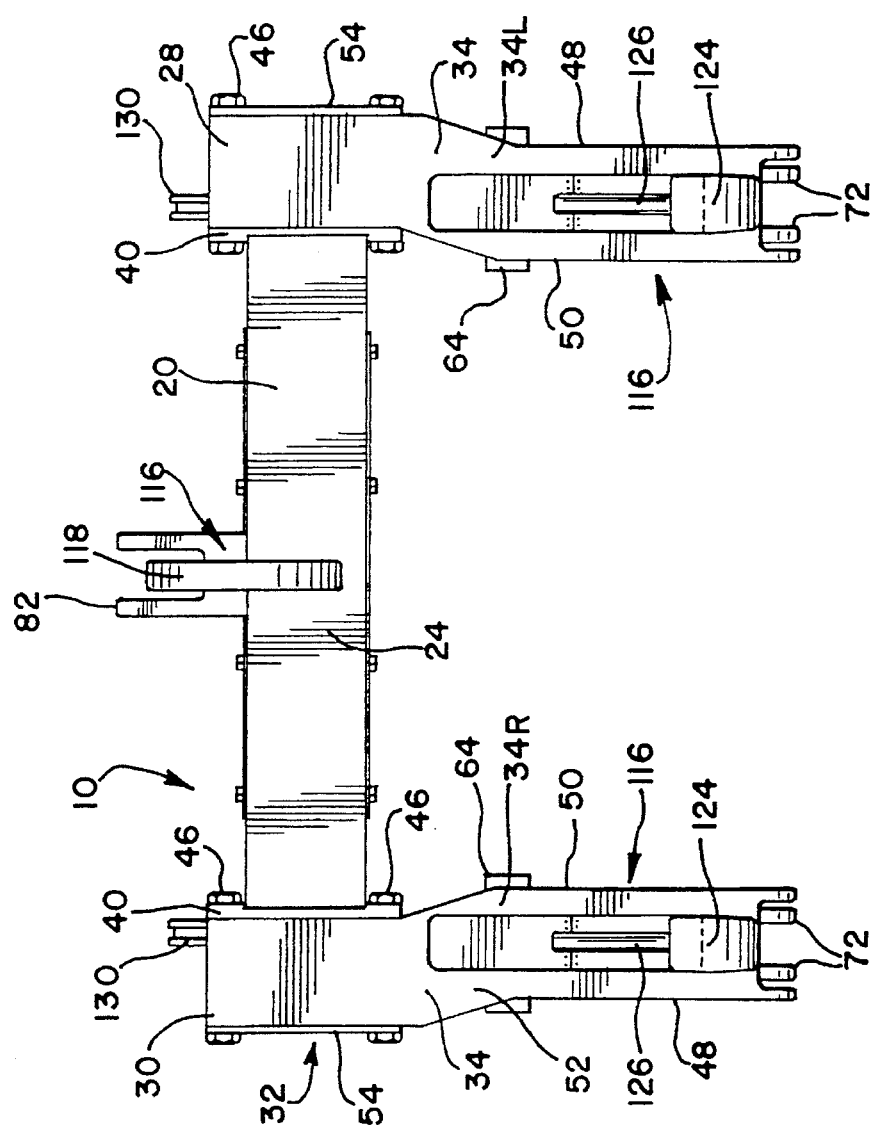
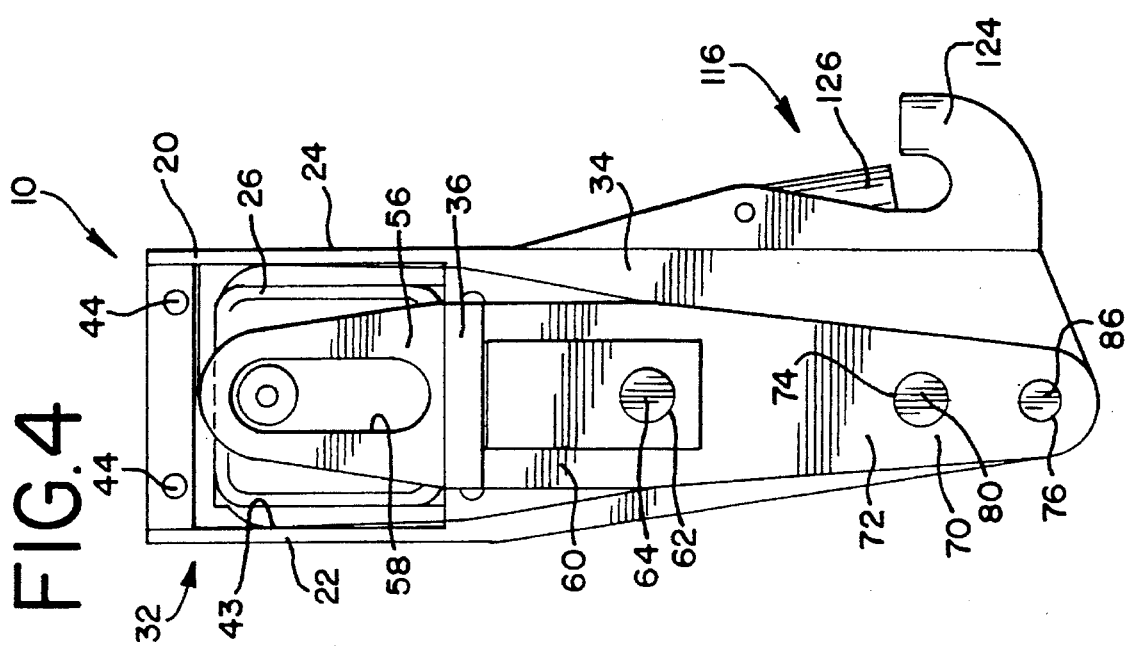

GUIDANCE SYSTEM HAVING ADJUSTABLE WIDTH CAPABILITY

BACKGROUND OF THE INVENTION

The present invention relates generally to guidance systems for tractor-drawn implements and, more specifically, to guidance systems which are adaptable to fit both of the common-sized tractor three-point quick hitch configurations that are presently in use.

A well recognized problem of modern mechanized agriculture is the potential for damaging crops by the lack of proper operator control over tractor-drawn implements. Trends in farming call for the use of single tractors to cultivate more and more crop rows per pass, and the chances increase for crop damage due to minor steering errors on the part of the operator.

Sophisticated implement and tractor guidance systems have been disclosed in an effort to provide an effective solution to this problem. One such device is disclosed in my U.S. Pat. No. Re. 34,080, which discloses a row following guidance device which will connect the left and right sides of the forward end of an implement to a tractor and which will adjust the length of each left and right connection such that the implement will follow the crop rows in spite of lateral deviations of the tractor relative to the crop rows. The device is mounted on a conventional quick-hitch so that it may be used with a variety of different implements. A row following weight or wand controls a steering valve upon any deviation from the alignment of the implement within the crop rows, and the steering valve corrects the deviation by lengthening one connection between the tractor and the implement and shortening the other connection. The row following weight or wand is mounted for movement independent of the implement so that the implement may be raised or lowered without affecting its operation.

One drawback of the existing guidance device is that it is very cumbersome to adjust to accommodate tractor and implement hitches of both wide and narrow designs, both of which are in common use, and may be used by any one grower. Presently, when such a conversion is needed, the guidance device must be almost totally disassembled and the central crossmember replaced by one of different length.

Thus, it is a first object of the present invention to provide an improved adjustable guidance device wherein the majority of the control and actuation system is located on a central cross member for ease of operation and maintenance.

It is another object of the present invention to provide an improved adjustable guidance device which is readily convertible between operation on wide and narrow tractor or implement hitches.

A further object of the present invention is to provide an improved adjustable guidance device wherein a positive power source is used to minimize componentry and to eliminate an excessive number of wear points.

Yet another object of the present invention is to provide an improved adjustable guidance device for row crop use wherein adjustment can be made from wide to narrow tractor or implement hitches using the existing components.

It is still another object of the present invention to provide an improved adjustable guidance device for row crop use wherein accurate and positive control is maintained over the position of each end of the device relative to the rear of the tractor.

SUMMARY OF THE INVENTION

Accordingly, the above-identified objects are met or exceeded by the present row following guidance device, which features the capability of accommodating either of two implement widths merely by the rearrangement of components. Also featured is a centrally located actuator which is readily disconnected from the respective first and second crank arm assemblies to maintain accurate implement control while providing the exchangeability of the crank arm assemblies. The linkage mechanism which connects the actuator to the respective crank arm assemblies provides for controlled corrective motion in a first direction on one side of the device as well as the implement, and a like correction in a reverse direction on the second side of the device and implement. The correction is effected simultaneously to both sides of the device by a single unit, which avoids the problems of adjusting and maintaining multiple fluid power cylinders as in prior designs.

More specifically, the present invention provides an adjustable row following guidance device for a tractor-drawn row crop implement, including a main support member disposed substantially transverse to the direction of travel of the implement as pulled by the tractor and having a first side and a second side. A first crank arm assembly is releasably attachable to either of the first side and the second side, and a second crank arm assembly is releasably attachable to either of the second side and the first side. The attachment of the crank arm assemblies to the main support member forms a generally inverted U-shape.

Each crank arm assembly includes a laterally offset configuration, so that when said first crank arm assembly is attached to said first end, and said second crank arm assembly is attached to said second end, said device has a first implement width, and when said first and second crank arm assemblies are reversed on said main support member, said device has a second implement width.

Also included on each crank arm assembly is a forward portion with a tractor connection point, and a rearward portion with an implement connection point, the implement connection point being rearwardly movable relative to the tractor connection point. The relative movement or pivoting action of the tractor connection points provides the corrective motion which maintains the directional stability of the implement. It is preferred that this relative pivoting action is under the control of the centrally located actuator.

In another embodiment, the present invention provides an adjustable row following guidance device for a tractor-drawn row crop implement, including a main support member disposed substantially transverse to the direction of travel of the implement as pulled by the tractor and having a first side and a second side. A first crank arm assembly is releasably attachable to either of the first and second sides, and a second crank arm assembly is releasably attachable to either of said second and first sides. The attachment of the crank arm assemblies to the main support member forms a generally inverted U-shape.

Each crank arm assembly has a laterally offset configuration, so that when the first crank arm assembly is attached to the first end, and the second crank arm assembly is attached to the second end, the device has a first implement width, and when the first and second crank arm assemblies are reversed on the main support member, the device has a second implement width.

Also, each crank arm assembly further includes a forward portion with a tractor connection point, and a rearward portion with an implement connection point, the implement connection point being rearwardly movable relative to tractor connection point. An actuator is connected to each of the first and second crank arm assemblies so that movement of the implement connection point on the first crank arm assembly in a first direction will cause a reverse pivotable motion of the implement connection point on the second crank arm assembly.

BRIEF DESCRIPTION OF THE DRAWINGS

FIG. 3 is a rear or implement side elevational view of the present guidance system, with portions omitted for clarity;

FIG. 4 is a side elevational view of the present guidance system with portions shown broken away for clarity;

DESCRIPTION OF THE PREFERRED EMBODIMENT

Figure 1:
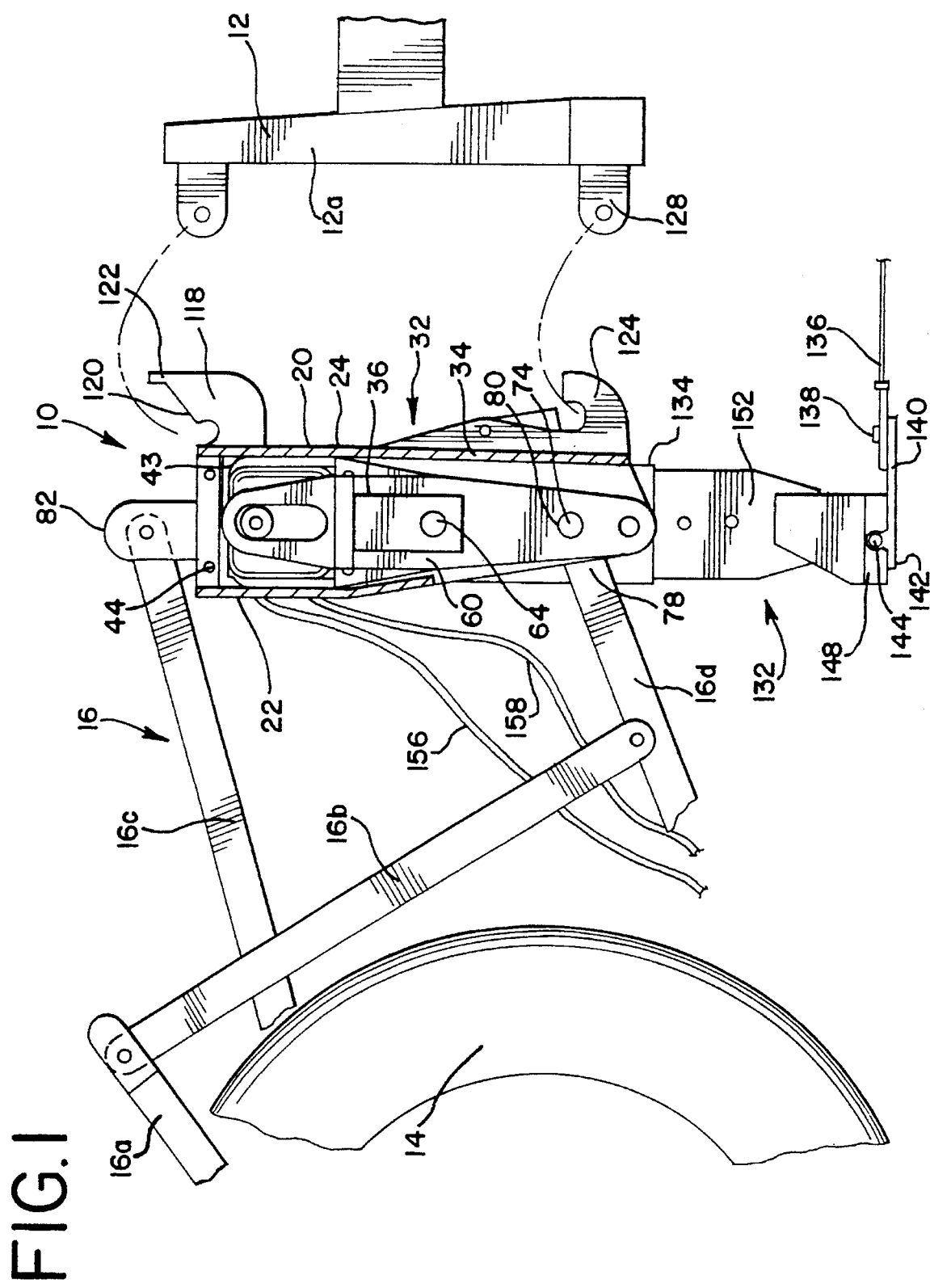
FIG. 1 is a side elevational view of the guidance system of the invention shown as installed on a tractor, portions being omitted for clarity.
Figure 2:
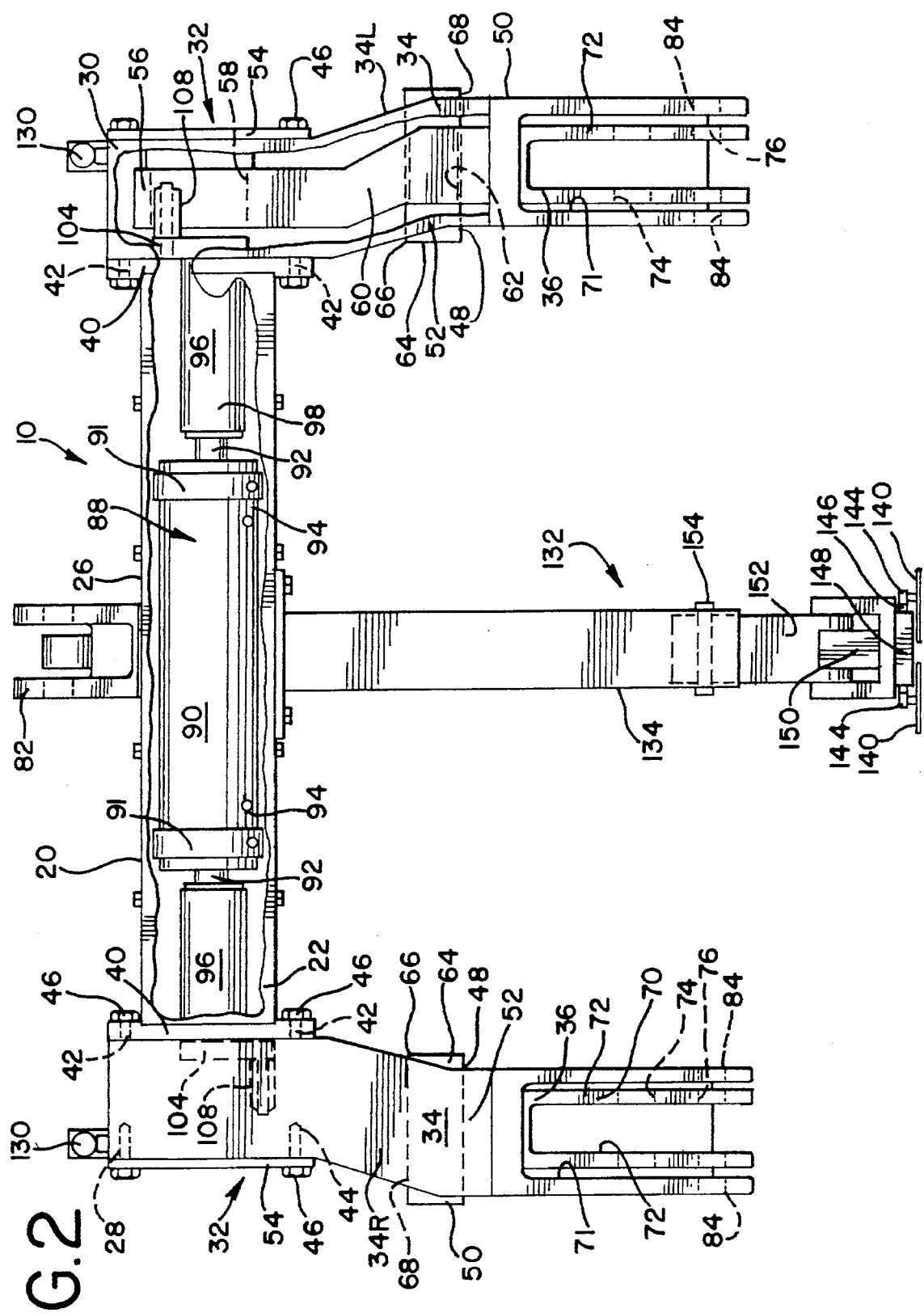
FIG. 2 is a front or tractor side elevational view of the present guidance system.

Referring now to the drawings, and in particular FIGS. 1 and 2, FIG. 1 depicts the present guidance device indicated generally at 10, which is operable to guide an implement 12 along a crop row independently of minor lateral deviations from that path by a tractor 14 (a wheel of which is partially indicated). Attachment of the present guidance device 10 to the tractor 14 is releasably accomplished via a conventional three-point hitch, generally designated 16. The hitch 16 includes spaced pairs of elongate linkage members designated 16a, 16b and 16d, and a single outer member 16c which, as is well known in the art, are typically used for mounting an implement a designated distance from the tractor 14.

The device 10 has an external housing 20, and the device 10 and the housing 20 both have a front or tractor side 22 and a rear or implement side 24. Included on the housing 20 is a center portion 26 (best seen in FIG. 2) which is a main support member disposed relatively parallel to the ground and transverse to the direction of travel of the tractor 14. The center portion 26 in the preferred embodiment is substantially square in cross-section and is tubular to accommodate working components as will be described. However, it is contemplated that the center portion 26 may be provided in other configurations as long as the working components are accommodated. At each left and right side, respectively designated 28 and 30 (as viewed from the tractor side 22) of the center portion 26 is releasably mounted a crank arm assembly generally designated 32. Each crank arm assembly 32 includes an outer side portion 34, which also makes up a portion of the housing 20, and a crank arm 36. When the crank arm assemblies 32 are mounted to the sides 28, 30 of the center portion 26, a generally inverted U-shape is defined (best seen in FIG. 2) which facilitates access to the tractor's power take-off (PTO) by the implement 12.

An important feature of the present guidance device 10 is that it is convertible between use for either wide and narrow tractor and implement hitches, one of which is partially shown at 12a in FIG. 1. To achieve this feature, the crank arm assemblies 32 are each configured to be attachable to either the left or right side 28, 30 of the center portion 26.

Referring now to FIG. 2, this attachment is shown in greater detail. Each of the left and right sides 28, 30 of the center portion 26 is provided with a radially flaring flange 40 into which are bored a plurality and preferably four mounting bores 42. In addition, each of the side members 34 has at its upper end a generally square transverse opening 43 (best seen in FIG. 4) bounded by upper and lower planar surfaces which are designed to oppose portions of the flanges 40. Tapped holes 44 are located in the surfaces to accommodate threaded fasteners 46, which are typically bolts passed through the bores 42.

It will be seen that each of the side members 34 has a first or wide setting side 48 and an opposite second or narrow setting side 50. This narrow or wide setting refers to the hitch category of the tractor and/or the implement. Either the wide or narrow setting sides will be attached to the center portion 26 in any given application. When the device 10 is assembled, both of the crank arm assemblies 32 will typically have the same side 48, 50 mounted to the center portion 26. In FIG. 2, the device 10 is shown in a wide placement, with the sides 48 attached to the center portion 26, an arrangement which permits connection to wide hitches or implements.

To obtain the different width settings, each of the side members 34, designated respectively 34L and 34R, has a middle portion 52 which is laterally offset. The designation 34L and 34R represents the view of the device 10 from the rear or implement side facing forward in the direction of travel. This construction provides the device 10 with the ability to be used with wide or narrow set implements 12 or tractors 14, depending which side is mounted to the center portion 26. To obtain a narrower setting (best seen in FIG. 3), the side members 34L, 34R will be reversed in their position at the ends of the center portion 26, with the side 50 of the side member 34R being located at the left side 28, and the side 50 of the side member 34L being located at the right side 30. Note that FIGS. 2 and 3 respectively depict front and rear views of the device 10. It is also contemplated that in some cases the side members 34L, 34R may be reversed from a wide-to-narrow setting or vice versa, by axially rotating each respective side member at its corresponding side of the center portion 26.

Since both sides 48, 50 of each crank arm assembly 34 have the above-identified planar surfaces and tapped holes 44, either side may be mounted to the center portion 26. The side 48, 50 not presently mounted to the center portion 26 is provided with a cover plate 54 which is secured to the corresponding side member 34 using threaded fasteners 46 engaging the corresponding set of tapped holes 44.

Referring now to FIGS. 1 and 4, inside each of the side members 34 is disposed one of the crank arms 36. Each such arm 36 includes an upper portion 56 with a transversely disposed, generally vertically positioned elongate slot 58. The slot 58 is generally coaxial with the transverse opening 43 of the corresponding side member 34. A middle portion 60 of the crank arm 36 is laterally offset to correspond to the offset portion 52 of the side member 34 (best seen in FIG. 2).

Just below the offset middle portion 60 is disposed a transverse pivot bore 62 dimensioned to slidingly accommodate a pivot pin 64, the ends of which engage corresponding coaxial pivot openings 66, 68 in the corresponding wide and narrow sides 48, 50 of the corresponding side member 36. Thus, the crank arm 36 pivots forward and back relative to the corresponding side member 34. More specifically, as the upper portion 56 of the crank arm pivots toward the tractor 14, a lower end 70 of the crank arm 36 pivots relative to the side member 34 away from the tractor and toward the implement 12. Each side member 34 has an opening 71 (best seen in FIG. 2) in the lower end of the front or tractor side 22 to prevent any interference with the movement of the crank arm's lower end toward the tractor during such pivoting action. By the same token, if the lower end 70 of the crank arm is held rigid, the side member 34 may pivot rearwardly toward the implement 12. Thus, it is also contemplated that while the side members 34 are preferably connected to the implement 12, and the crank arms are connected to the tractor 14 (best seen in FIG. 1), it is also contemplated that the side members could be connected to the tractor and the crank arms connected to the implement.

Referring now to FIGS. 1, 2 and 4, at the lower end 70 of each crank arm is found a pair of spaced, generally parallel legs 72. The legs 72 are securely fixed to, or even integral with the middle portion 60, and each leg preferably has upper and lower transverse openings, respectively designated 74 and 76. The corresponding openings 74 and 76 of each leg 72, and of each crank arm 36 are in registry with each other. Upper openings 74 provide attachment points for a link end 78 of the hitch member 16d, through which a locking pin 80 is inserted to pivotally attach the unit 10 to the tractor 14 (best seen in FIG. 1). The link end 78 preferably is held between the two legs 72. In the preferred embodiment, one of the sides 48, 50 of the side member 34 is provided with a cutout portion (not shown) to provide access to the pin 80. While the openings 74 provide lower attachment points for the connection of the device 10 to the hitch 16, the central portion at an upper end has a clevis mount 82 which engages a hitch member 16c.

The lower openings 76 of each leg 72 are arranged to be in registry with corresponding locking openings 84 (best seen in FIG. 2) in each of the sides 48, 50 of each side member 34. When the unit 10 is not being used as a guidance device, a pin 86 (best seen in FIG. 4) inserted through the openings 84 and 76 prevents the crank arm 36 from pivoting relative to the side member 34.

Referring now to FIG. 2, pivoting action of the crank arms 36 relative to the side members 34 is under the control of an actuating mechanism, generally designated 88, which, in the preferred embodiment, is located within the center portion 26. The principal component of the actuating mechanism 88 is an actuator 90 which is preferably a helical hydraulic rotary actuator. A suitable type of such actuator is manufactured by Helac Corporation, of Enumclaw, Wash. under the HS Series model designation. However, any equivalent actuator providing controlled rotary motion of a shaft is contemplated. A pair of brackets 91 preferably suspend the actuator 90 from an upper inner surface of the center portion 26. It is also contemplated that the actuator 90 may be constructed so that its housing forms the center portion 26, and the side members 34L and 34R are mounted directly to the ends of the actuator housing. In this latter embodiment, a separate center portion 26 is not necessary.

The operation of the actuator 90 is such that a shaft 92 with a central helically threaded portion (not shown) is rotated approximately 90 degrees under hydraulic control in the form of a piston (not shown) as is typical for such devices. Ports 94 located near each end of the actuator 90 provide for the entry of hydraulic fluid. As the piston is subjected to pressure to move to the right or left inside the actuator 90, the shaft 92 is rotated as it is pushed through a helically threaded nut-like fixture (not shown) located within the actuator.

Figure 6:
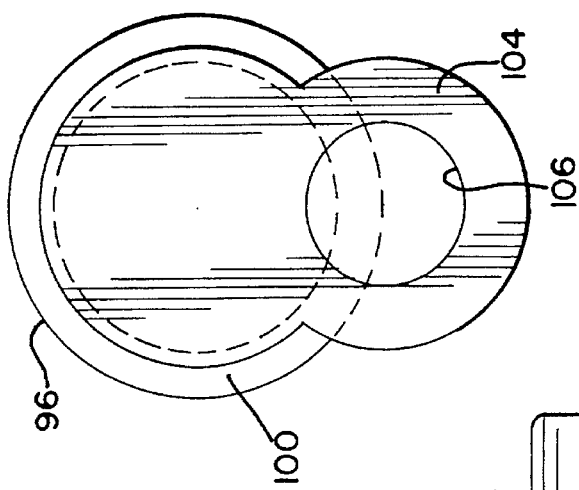
FIG. 6 is an end view of the actuator linkage depicted in FIG. 5.
Figure 5:
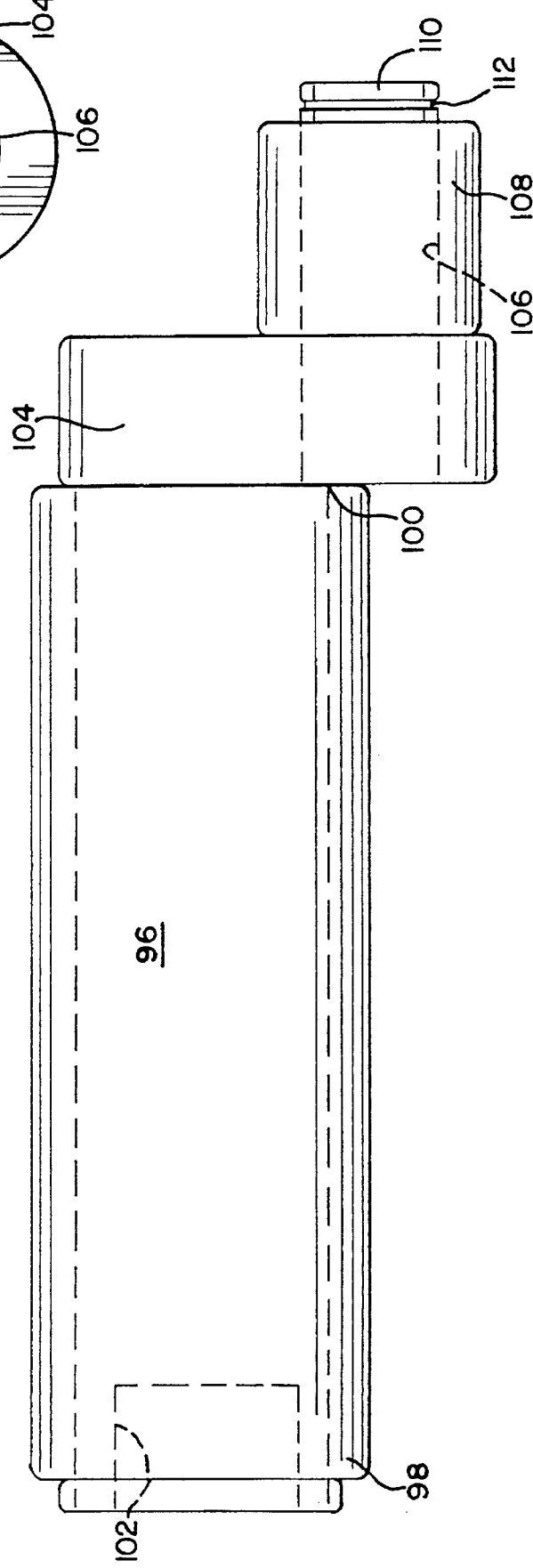
FIG. 5 is a fragmentary front elevational view of the actuator linkage used in the present guidance system.

Referring now to FIGS. 2, 5 and 6, this rotation is transferred to the crank arms 36 by means of an actuator link shaft 96 having a splined end 98 and an opposite cam end 100. The splined end 98 has a splined socket 102 which matingly engages the end of the actuator shaft 92, which is also splined. To save weight and material, the actuator link shaft 96 is preferably a hollow tube.

Opposite the splined end 98, the cam end 100 includes an eccentric cap 104 which is secured to the shaft 96, and which is provided with an eccentric bore 106. Both the cap 104 and the splined socket 102 are preferably secured to the link shaft 96, preferably by welding. A cam roller 108 is rotatably attached to the eccentric bore 106 by means of an eccentric pin 110 which is fixed within the eccentric bore. An annular groove 112 in the end of the pin 110 accommodates a spring clip (not shown) which retains the roller 108 upon the pin 110.

One actuator link shaft 96, eccentric cap 104 and cam roller 108 is provided to each end of the actuator 90, and the two shafts 96 are situated so that the eccentric pins 110 are located 180 degrees out of phase of one another (best seen in FIG. 2). The cam rollers 108 are each engaged in a corresponding one of the elongate slots 58 in the crank arms 36. Thus, the elongate slots 58 act as cam followers. As the actuator 90 rotates the shaft 92 in a specified direction, the respective 180 degree offset positions of the two eccentric pins 110 will cause opposing movement of the corresponding crank arms 36 relative to the respective side member 34.

Referring now to FIGS. 3 and 4, the rear or implement side 24 of the device 10 will be described in further detail. Most significantly, the implement side includes a quick hitch latch system 116 for rapidly connecting and disconnecting implements 12 to and from the device 10. On the center portion 26, the latch system 16 takes the form of a hook 118 (best seen in FIG. 1) having an upwardly opening pocket 120 and an upwardly projecting guard formation 122 to prevent the unwanted detachment of the implement during operation.

In addition, each of the side members 34 has at its lower end an upwardly opening hook 124 with a pivoting, biased locking dog 126. The dog 126 is designed to pivot towards the front or tractor side 22 when the corresponding implement clevis mount 128 is pushed into the hook 124. The dog then springs back into the position depicted in FIGS. 1 and 4 to hold the implement in engagement with the device 10. A release lever 130 is mounted atop each side member 34 and is connected via a mechanical linkage (not shown) to the corresponding locking dog 126. Raising of the lever 130 overcomes the biasing force holding the dog in the operational position, and retracts the dog, permitting the disengagement of the implement 12.

Referring now to FIGS. 1 and 2, to begin a crop maintenance operation, such as cultivating, the device 10 is mounted to the tractor 14, and the implement 12 is mounted to the device as described above. The device 10 then becomes part of a guidance system which further includes a lateral movement detection assembly or wand assembly, designated generally 132. The wand assembly 132 monitors the movement of the tractor 14 relative to the crop row in order to make corrections or adjustments in the position of the implement 12. The structure and operation of the movement detection system will be described broadly herein, and a more detailed description is provided in commonly assigned U.S. Pat. No. 5,170,849, which is incorporated by reference.

As shown in FIGS. 1 and 2, the wand assembly 132 is supported by a center housing 134 secured to the underside of the center portion 26, but it should also be appreciated that it is not essential that the center housing 134 be present. The wand assembly 132 may be mounted laterally of the center of the device 10 by one or two rows if desired. In this regard, such an off center mounting may be desirable for implements which require the use of the tractor power takeoff, which is located in the center.

The wand assembly 132 has a generally wishbone shape and comprises two wand arms 136 (only one shown in FIG. 1), which extend rearwardly of the guidance device 10. These wand arms 136 can be vertically adjusted and the spacing between them can also be adjusted to correspond with the width of rows of the crop or the like, which they are intended to detect. The distance between the two wands can be adjusted by varying the location of bolts 138 located in horizontally oriented plates 140, which preferably have an end portion 142 and a sleeve 144 which fits on a shaft element 146. The plates 140 therefore are free to pivot vertically around the shaft 146. The shaft elements 146 each have an enlarged end bushing portion (not shown) which is force fit into a suitable aperture located in a pivotal block 148. This block also is configured to be adjusted for the purpose of changing the angular orientation of the plates 140 when the implement is raised during traveling or turning around in the field. This results in the wand arms 136 being elevated as the implement is elevated.

The angular position of the wand arms 136 relative to the guidance device 10 is detected by the structure to which the block 148 is mounted. This block 148 is adapted to rotate relative to the center housing 134. A spring biased centering mechanism 150 located within a lower, slidably adjustable insert portion 152 of the center housing 134, returns the wands to a center position if they are not in contact with crops, rows or the like. The vertical position of the wands 136 relative to the ground is adjusted by changing the vertical relationship of the insert portion 152 within the tubular center housing 134. Set screws or pins 154 are used to secure the relative position of the insert 152 within the housing 134.

As the wands 136, responding to the location of the crop row, move the plates 140 and, correspondingly, the pivotal block 148, hydraulic fluid is appropriately directed to cause a corresponding adjustment of the actuator 90. In other words, fluid pressure is directed to one or the other sides of the shaft 92 to cause a rotation thereof through the operation of the actuator. It should be noted here that the actuator 90 is preferably connected to the hydraulic system of the tractor 14 through lines 156, 158. As stated above, the pins 110 and rollers 108 of the corresponding left and right sides 28, 30 are 180 degrees offset from each other. Thus, depending on the direction and degree of movement of the base frame 146 relative to the row, the actuator 90 will cause a corresponding compensating and directionally stabilizing movement of the crank arms 36 relative to the side members 34.

For example, assuming the tractor 14, implement 12 and device 10 are viewed from the rear, if the implement drifts to the operator's left from its desired position, the actuator 90 will be signalled to cause a relative pivoting action in the right side crank arm assembly 32 of the crank arm 36 relative to the side member 34 to move toward the tractor, while the left side crank arm pivots a substantially equal amount relative to the side member away from the tractor. Implement drift to the operator's right will trigger a reverse rotation of the shaft 92 and consequential reverse pivoting action of that just described. Since the present system is continually monitoring the implement position, any corrections are typically minor in nature, and the implement is maintained in a relatively stable position relative to the row.

While a particular embodiment of the guidance system hitch having adjustable width capability of the invention has been shown and described, it will be appreciated by those skilled in the art that changes and modifications may be made thereto without departing from the invention in its broader aspects and as set forth in the following claims.

What is claimed is:

1. An adjustable row following guidance device for a tractor-drawn row crop implement, comprising:

a main support member disposed substantially transverse to the direction of travel of the implement as pulled by a tractor and having a first side and a second side;

a first crank arm assembly being attached to said first side;

a second crank arm assembly being attached to said second side, said attachment of said crank arm assemblies to said main support member forming a generally inverted U-shape;

each said crank arm assembly further including a forward portion with a tractor connection point, and a rearward portion with an implement connection point, said implement connection point being rearwardly movable relative to said tractor connection point; and actuating means for moving said first implement connection point relative to said second implement connection point to adjust the position of the implement relative to the tractor, wherein said actuating means includes a rotary actuator provided with a rotary eccentric linkage means for connecting said actuator to said first and second crank arm assemblies.

2. The device as defined in claim 1 wherein said linkage means includes at least one actuator link shaft connected to said actuator, an eccentric cap mounted to said shaft, and a cam roller rotatably mounted in said eccentric cap.

3. The device as defined in claim 1 further including sensing and control means for sensing the orientation of said implement relative to adjacent crop rows and for controlling said actuating means in response thereto.

4. The device as defined in claim 1 wherein each said crank arm assembly includes a crank arm pivotally connected to a side member, said side member being attachable to one of said first and second ends of said main support member.

5. The device as defined in claims 4 wherein each said crank arm includes an upper portion with a cam follower slot, and a lower portion, laterally offset from said upper portion, with means for releasably connecting the tractor thereto.

6. The device as defined in claim 5 wherein said lower portion further includes a pivot bore about which said upper and lower port ion pivot in a forward and rearward direction.

7. The device as defined in claim 1 further including releasable hitch locking means for lockingly accommodating portions of a hitch and having release means for manually releasing the hitch from the device.

8. The device as defined in claim 1 further including a hook on said side member, and a dog member pivotable into and out of opposing relationship to said hook, said dog member being biased into said opposing relationship.

9. The device as defined in claim 8 further including a manual release lever connected to said dog member to retract said dog member out of said opposing relationship.

10. An adjustable row following guidance device for a tractor-drawn row crop implement, comprising:

a main support member disposed substantially transverse to the direction of travel of the implement as pulled by a tractor and having a first side and a second side;

a first crank arm assembly being releasably attachable to either of said first side and said second side;

a second crank arm assembly being releasably attachable to either of said second side and said first side, said attachment of said crank arm assemblies to said main support member forming an inverted U-shape;

each said crank arm assembly having a laterally offset configuration, so that when said first crank arm assembly is attached to said first end, and said second crank arm assembly is attached to said second end, said device has a first implement width, and when said first and second crank arm assemblies are reversed on said main support member, said device has a second implement width;

each said crank arm assembly further including a forward portion with a tractor connection point, and a rearward portion with an implement connection point, said implement connection point being rearwardly movable relative to said tractor connection point;

a rotary actuator connected to each of said first and second crank arm assemblies so that movement of said implement connection point on said first crank arm assembly in a first direction will cause a reverse movement of said implement connection point on said second crank arm assembly; and said actuator includes a shaft having opposed ends, each of which is connected to a corresponding one of said crank assemblies, the rotation of said shaft is controlled by said actuator to cause said relative pivoting movement of said crank arm relative to said crank arm assembly.

11. The device as defined in claim 10 wherein said movement of said first implement connection point by said actuator in said first direction is substantially equal to the amount of said movement of said second implement connection point in said reverse direction.

12. The device as defined in claim 10 wherein each said crank arm assembly includes a crank arm pivotally connected to a side member, said side member being attachable to one of said first and second ends of said main support member.

13. The device as defined in claim 12 wherein each said crank arm includes an upper portion with a cam follower slot, and a lower portion, laterally offset from said upper portion, with means for releasably connecting the tractor thereto.

14. The device as defined in claim 13 wherein said lower portion further includes a pivot bore about which said upper and lower portion pivot in a forward and rearward direction.

15. An adjustable row following guidance device for a tractor-drawn row crop implement, comprising:

a main support member disposed substantially transverse to the direction of travel of the implement as pulled by a tractor and having a first side and a second side;

a first crank arm assembly being releasably attachable to either of said first side and said second side;

a second crank arm assembly being releasably attachable to either of said second side and said first side, said attachment of said crank arm assemblies to said main support member forming a generally inverted U-shape;

each said crank arm assembly including a laterally offset configuration, so that when said first crank arm assembly is attached to said first end, and said second crank arm assembly is attached to said second end, said device has a first implement width, and when said first and second crank arm assemblies are reversed on said main support member, said device has a second implement width;

each said crank arm assembly further including a forward portion with a tractor connection point, and a rearward portion with an implement connection point, said implement connection point being rearwardly movable relative to said tractor connection point; and actuating means for moving said first implement connection point relative to said second implement connection point to adjust the position of the implement relative to the tractor, said actuating means including a rotary actuator provided with linkage means for connecting said actuator to said crank arm assemblies so that said actuator controls the movement of said first and second crank arm assemblies regardless of whether they are assembled on said main support member to define the first implement width or the second implement length.

* * * * *